United States Patent
Gopal et al.

(10) Patent No.: US 11,657,188 B2
(45) Date of Patent: May 23, 2023

(54) SYSTEM AND METHOD FOR RESTRICTING INTERACTION WITH AN INFORMATION HANDLING SYSTEM

(71) Applicant: DELL PRODUCTS, LP, Round Rock, TX (US)

(72) Inventors: Pradeep Gopal, Round Rock, TX (US); Daniel Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 392 days.

(21) Appl. No.: 16/836,032

(22) Filed: Mar. 31, 2020

(65) Prior Publication Data
US 2021/0303739 A1    Sep. 30, 2021

(51) Int. Cl.
*G06F 21/85* (2013.01)
*G06F 1/28* (2006.01)
*G06F 13/42* (2006.01)

(52) U.S. Cl.
CPC ............ *G06F 21/85* (2013.01); *G06F 1/28* (2013.01); *G06F 13/4282* (2013.01); *G06F 2213/0042* (2013.01)

(58) Field of Classification Search
CPC ......... G06F 1/26; G06F 1/28; G06F 13/4282; G06F 21/629; G06F 21/82; G06F 21/85; G06F 2213/0042
USPC .......................................................... 726/1
See application file for complete search history.

(56) References Cited

U.S. PATENT DOCUMENTS

| | | | |
|---|---|---|---|
| 9,369,495 B2 | 6/2016 | Gillon et al. | |
| 10,482,253 B2 | 11/2019 | Robison et al. | |
| 11,163,871 B2* | 11/2021 | Iyer | G06F 9/4406 |
| 2007/0027980 A1* | 2/2007 | Herrod | H04L 41/0893 709/224 |
| 2012/0151551 A1* | 6/2012 | Readshaw | G06F 21/55 726/1 |
| 2014/0007222 A1* | 1/2014 | Qureshi | G06F 21/14 726/16 |
| 2015/0220736 A1 | 8/2015 | Martinez et al. | |
| 2016/0370843 A1* | 12/2016 | Gatson | G06F 1/3287 |
| 2017/0118249 A1* | 4/2017 | Motukuru | H04L 63/08 |
| 2018/0367568 A1* | 12/2018 | Martinez | H04L 63/0272 |
| 2019/0044914 A1* | 2/2019 | Kleiner | H04L 63/0236 |
| 2019/0245930 A1* | 8/2019 | Rahkonen | H04L 67/34 |
| 2020/0092716 A1* | 3/2020 | Kaushik | H04W 12/79 |
| 2020/0210598 A1* | 7/2020 | Giri | G06F 21/6218 |
| 2020/0285764 A1* | 9/2020 | Nitzan | H04L 63/20 |
| 2020/0356694 A1* | 11/2020 | Lee | H04L 9/3263 |
| 2021/0216639 A1* | 7/2021 | Hamlin | G06F 21/32 |
| 2022/0014533 A1* | 1/2022 | Almaz | H04L 43/16 |

* cited by examiner

*Primary Examiner* — Robert J Lopata
(74) *Attorney, Agent, or Firm* — Larson Newman, LLP (57) ABSTRACT

An information handling system includes a policy store, wherein one of the policies is associated with a feature of a device of the information handling system. If a first assertion for the information handling system to enter a non-interactive mode is detected, then a configuration setting associated with the feature of the device is modified. Modifying the configuration setting associated with the feature of the device includes restricting power transition states of the device.

19 Claims, 3 Drawing Sheets

SYSTEM AND METHOD FOR RESTRICTING INTERACTION WITH AN INFORMATION HANDLING SYSTEM

FIELD OF THE DISCLOSURE

The present disclosure generally relates to information handling systems, and more particularly relates to restricting interactions with an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a policy store, wherein one of the policies is associated with a feature of a device of the information handling system. If a first assertion for the information handling system to enter a non-interactive mode is detected, then a configuration setting associated with the feature of the device is modified. Modifying the configuration setting associated with the feature of the device includes restricting power transition states of the device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
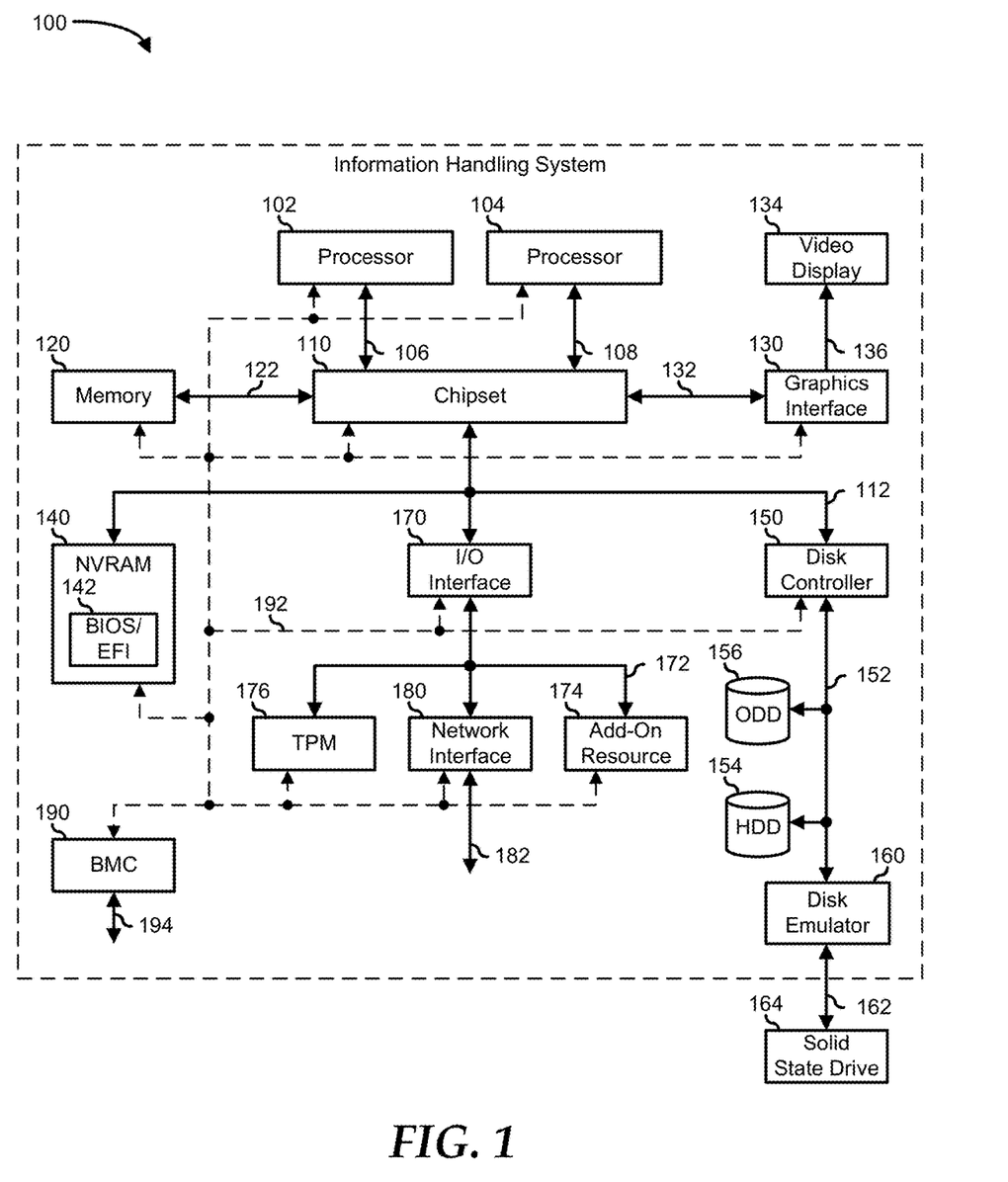
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 also referred to as a service processor is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller and a service processor. A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a USB or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

An administrator of an information handling system may desire to limit interactions, such as user or software interactions, with the information handling system. For example, a point of sale terminal may be configured to interact with by a user only during certain times. Thus, an employee may leave her desk and may want to restrict access to her computer. In yet another example, a parent may want to restrict his child's access to a computer, a cellular telephone or a mobile computing device.

The current system and method provide a security management framework to restrict a user or software interaction with the information handling system. In particular, the current system and method may provide the ability to programmatically restrict the system interaction events at the hardware and/or firmware level based on a user initiation, a timer and/or an entrance and an exit event. For example, the current system and method may enhance the security of the information handling system to ensure that the resources of the information handling system are not available during a prescribed time.

Figure 2:
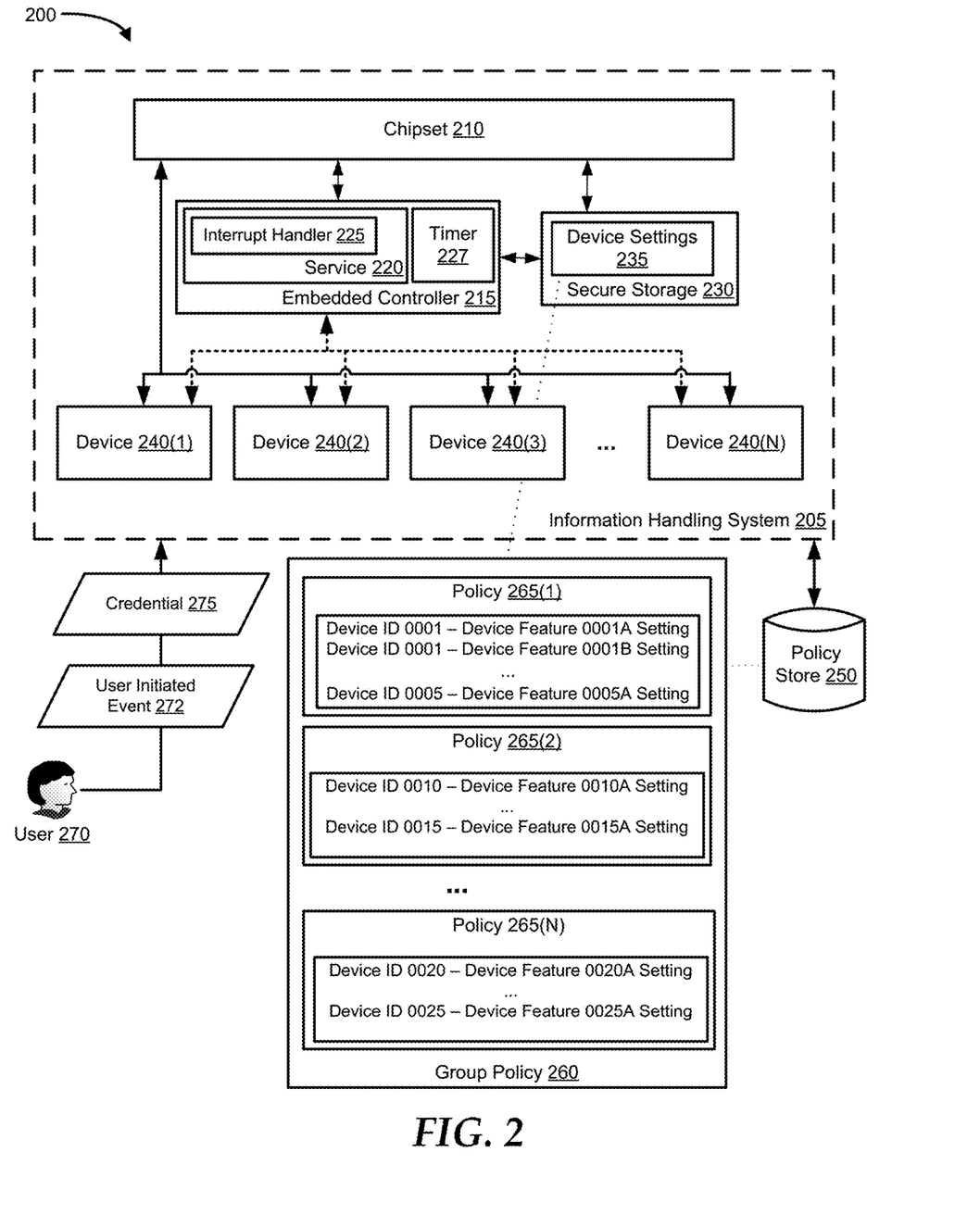
FIG. 2 is a block diagram illustrating an example of a system for restricting interactions with an information handling system, according to an embodiment of the present disclosure.

FIG. 2 illustrates a system 200 for restricting I/O traffic and user interaction based on firmware and hardware restrictions. System 200 may provide a framework for device security management at the hardware and firmware level. For example, system 200 may allow an administrator to enable and/or create one or more policies and implement them to manage one or more firmware and/or devices. System 200 may include an information handling system 205 which is similar to information handling system 100 of FIG. 1, a user 270 and a policy store 250. Information handling system 205 may include a chipset 210, an embedded controller 215, a secure storage 230 and devices 240(1)-204(N) where N>1. User 270 may submit a user-initiated event 272 along with a credential 275 such as a digital certificate, token, etc. Policy store 250 may include policies 265(1)-265(N) which may be in a group policy 260. Embedded controller 215 may include a timer 227 and a service 220 which may include an interrupt handler 225.

Embedded controller 215 may be similar to BMC 190 of FIG. 1 and may be configured to provide out-of-band management facilities for the management of information handling system 205 even if information handling system 205 is powered off or powered to a standby state. Embedded controller 215 may include a processor, a memory, and an out-of-band network interface separate from and physically isolated from an in-band network interface of information handling system 205 and/or other resources of information handling system 210*a*.

Embedded controller 215 may include service 220 which may be configured to allow for a policy asserted configuration to restrict user interaction capabilities to the information handling system 205. In particular, service 220 may assert restriction operations into appropriate, populated hardware when in a non-interactive mode. The non-interactive mode may limit access and/or interaction with information handling system 205 while an interactive mode allows access and/or interaction with information handling system 205. Service 220 may enter and enable the non-interactive mode upon direction or assertion. The policy asserted configuration may be user-initiated, time-based, and/or system management based. To communicate with various components of information handling system 205, such as chipset 210, service 220 may use advanced configuration and power interface (ACPI), the SMBUS or a shared memory such as secure storage 230. When enabled, service 220 may filter various I/O activities to information handling system 205. For example, service 220 may filter power button events, keyboard I/O events and eliminate power to available data paths directed to the operating system such as the USB, touch controllers, etc. that may allow for wake events. Service 220 may utilize previously implemented and protected secured wake event methods such as laptop hotkey combinations, the USB and keyboard I/O filters, etc. to allow management or administrative overrides of power and interaction I/O events.

Service 220 may interact with an operating system service which may allow an administrator to create and/or deploy policies. The policies may include new or previously implemented service level restrictions which may be allowed to persist. Additionally, service 220 may be configured to request for verification to enter or exit the non-interactive mode and the interactive mode. In one embodiment, service 220 may allow an administrator to exit the non-interactive mode regardless of current policies being enforced such as to address potential physical attacks. Service 220 may include an interface, wherein an administrator may add, modify, and/or remove a policy or a group of policies. The interface may be a command line interface, a graphical user interface, etc.

Interrupt handler 225 may be configured to monitor information handling system 205 for an interrupt such as an assertion. The assertion may be associated with a policy or a group of policies. The assertion may be an event to enter a non-interactive mode or an interactive mode. The non-interactive mode may be a mode, wherein user and/or software interaction with information handling system 205 and/or one or more of devices 240(1)-240(N) is limited based on the policy or the group of policies. In particular, the policy may limit user interaction to one or more features of a device by adjusting the settings of those features.

The assertion may be received via different means. In one embodiment, the assertion may be initiated by a user. For example, the user may use a pre-determined hotkey combination to lock or unlock information handling system 205. A user may be prompted to enter a passcode or to provide a secure credential before locking or unlocking information handling system 205. In another embodiment, the assertion may be timer based. For example, the touchscreen may be disabled at certain times of the day. In yet another embodiment, the assertion may be based on operating system instructions. For example, during the power-on self-test (POST), a policy may enable various I/O ports. In particular, the policy may enable a USB port while a specific set of ports such as the Thunderbolt™ may be disabled or powered off.

Timer 227 may be configured to allow embedded controller 215 to measure elapsed time associated with a policy or a group of policies. For example, timer 227 may allow embedded controller 215 to measure elapsed time, wherein the device is in a particular power state. In another example, timer 227 may be used to enable embedded controller 215 to limit the time for which power is supplied to a device such as by cutting power to the device after a specific period of time has passed. Timer 227 may be configured to track the current time zone while measuring the elapsed time. By tracking the current time zone, timer 227 may prevent errors due to information handling system 205 moving to a different time zone.

Information handling system 205 may include multiple devices, such as devices 240(1)-240(N). Each device may have a corresponding unique device identifier. For example, device 240(1) may be associated with a device identifier that is different from a second device identifier that is associated with device 240(2). Each device may be associated with one or more features. For example, device 240(1) may be associated with one or more ports. Each feature may be associated with one or more configuration settings. For example, a port associated with device 240(1) may be enabled or disabled.

An administrator may generate one or more policies, such as policies 265(1)-265(N) to manage devices 240(1)-240(N). The policies may facilitate a change or an update to firmware or any other alteration associated with a device. One policy may be more restrictive than another policy. Each policy may have a unique policy identifier and may be part of a group policy such as group policy 260. The group policy may be created based on the common characteristics of the policies in the group. For example, the group policy may be based on the type of assertion associated with the policy, such as whether the assertion is user-initiated, time-based or an operating system instruction.

Each of policies 265(1)-265(N) may be generated to manage features and/or limit access to the device, such as by modifying the feature settings of the device. As, such each one of policies 265(1)-265(N) may include custom device feature settings or configuration information. Each of the policies may be associated with multiple devices and each one of the devices may have multiple features. Each of the features may have one or more settings also referred to as configuration settings and feature or device settings. For example, the feature may be enabled, disabled, or shutdown. For example, an attribute associated with a USB port setting may be enabled or disabled by setting the attribute system. USBFront.Disable. Service 220 may be configured to translate or implement the policies into one or more settings. The settings may be stored in a non-volatile memory associated with embedded controller 215. For example, device settings 235 stored in secure storage 230 may be based on policies 265(1)-265(N). Secure storage 230 may be a non-volatile memory configured to save the feature settings based on policies 265(1)-265(N). As such, the settings stored in the non-volatile memory may persist even if information handling system 205 is rebooted. Secure storage 230 and embedded controller 215 may operate in a secure or privileged environment that is resistant to computer security attacks and other modifications as a result of the isolation of secure storage 230 and embedded controller 215.

Policies 265(1)-265(N) may limit access to a device based on a level of sensitivity assigned to the device. Devices classified with low-level sensitivity may be allowed to continue operation but not allow certain inputs. For example, an audio device may continue to stream audio but the user may not be allowed to change the station but may be allowed to change the volume. Devices classified with mid-level sensitivity may be disabled for all inputs, while devices classified with high-level sensitivity may be powered off.

Policy store 250 may be a memory or data storage system configured to store policies 265(1)-265(N). Policy store 250 may be located in information handling system 205 or at a secure location accessible by information handling system 205 such as in a data storage server within a private network. Policy store 250 may store policies for information handling systems other than information handling system 205. Policy store 250 may organize policies 265(1)-265(N) through the use of a data structure such as a database, a table, a hash table, an array, an array list, a tree, a list, etc. or a combination thereof.

Figure 3:
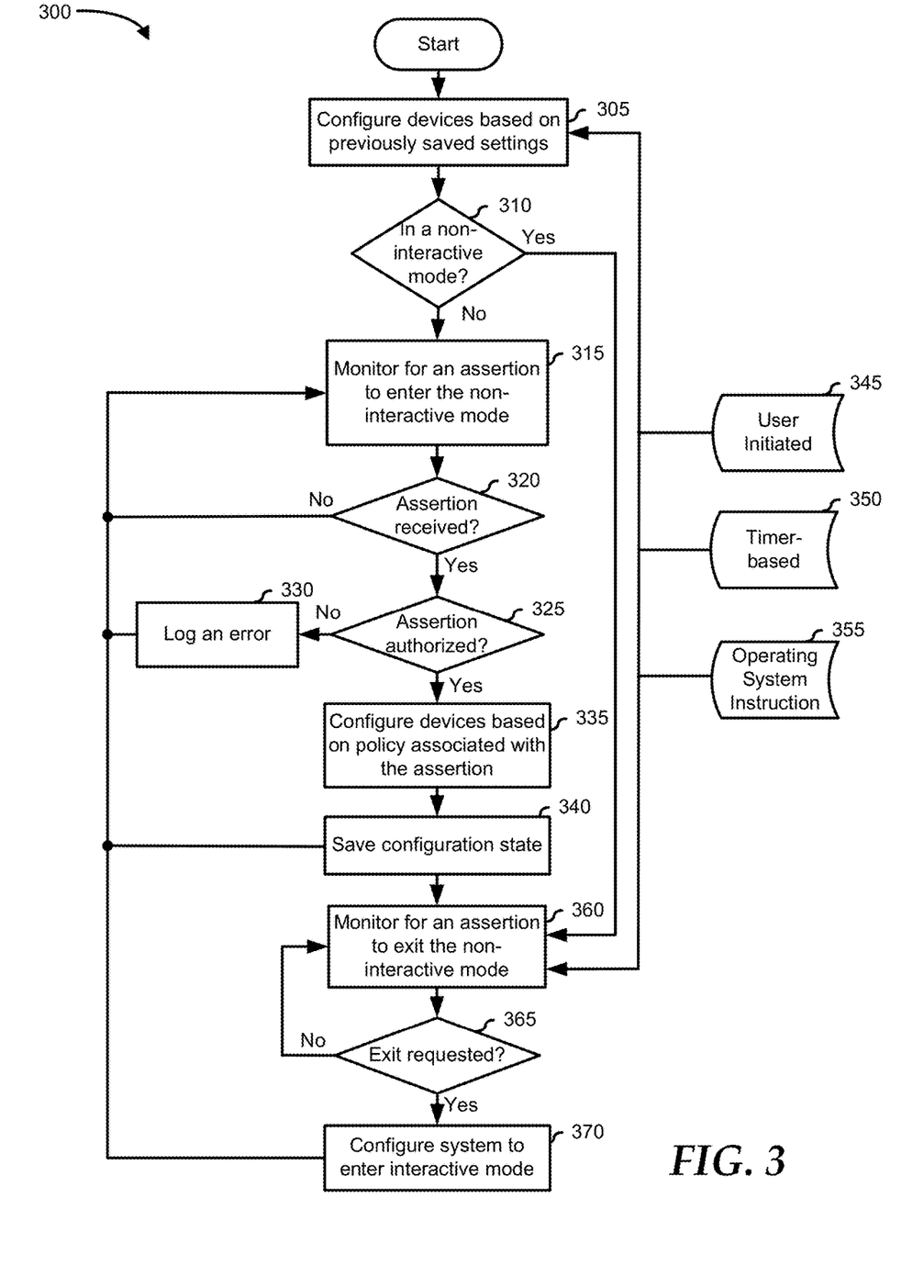
FIG. 3 is a flowchart illustrating an example of a method for restricting interactions with an information handling system, according to an embodiment of the present disclosure.

FIG. 3 illustrates a method 300 for restricting I/O traffic and user interaction based on firmware and hardware restrictions. Method 300 may provide a framework for administrators to generate and implement policies to manage firmware, components and/or devices of an information handling system. For example, a policy may be generated to configure the behavior of a device. In another example, the policy may be generated to restrict usage of the device for a certain time period. The restriction may occur periodically. For example, the usage of the device may be restricted from 6:00 PM to 7:00 AM every day. The restriction may be reversed by a particular service or user with administrator privileges.

Method 300 may be performed by one or more components of FIG. 2 such as embedded controller 215 and typically starts at block 305 where the method configures firmware and/or devices based on previously saved configuration settings. This may occur during a change in a power transition state, such as when the information handling system is powered on or rebooted. The method proceeds to decision block 310 where the method determines whether the information handling system is in a non-interactive mode. If the method determines that the information handling system is in a non-interactive mode, then the "YES" branch is taken and the method proceeds to block 360. If the method determines that the information handling system is not the non-interactive mode, then the "NO" branch is taken and the method proceeds to block 315.

At block 315, the method monitors the information handling system for an assertion such as an event to enter the non-interactive mode. The assertion may be associated with a policy to limit user or software interaction with the information handling system. The policy may include modification to configuration settings of a component or a device of the information handling system or simply referred to as the device. The policy may also include modifications or updates to the device firmware. The non-interactive mode may be a system mode, wherein at least one feature of the device is restricted, disabled, and/or unavailable for interaction. The assertion may be received via various means. For example, the assertion may be received via external means such as user-initiated as shown in block 345. A user may use a hotkey combination to enter the non-interactive mode. The assertion may also be received via internal means. For example, the assertion may be based on an internal timer as shown in block 350 or an operating system instruction as shown in block 355. For example, a watchdog timer may initiate a watchdog timeout event to put the information handling system in the non-interactive mode.

In another embodiment, the information handling system may already be in a non-interactive mode when another assertion, such as a second assertion, is received. The method may compare a first policy associated between a first assertion and a second policy associated with the second assertion to determine whether the second policy is more or less restrictive than the first policy. Each policy may be assigned a restriction level and/or an entrance or exit criteria or operation before the policy is implemented or reversed. The restriction level may also be determined via rules. If the second policy is more restrictive, then the method may modify the configuration settings accordingly. For example, if the first policy is to disable a port associated with a USB and the second policy is to remove power associated with the USB, then the second policy may be determined to be more restrictive. The second policy would be implemented without exiting the non-interactive mode, that is power is removed from the USB. In another example, if the second policy is to disable the network in addition to the first policy, then the second policy may also be determined to be more restrictive. The second policy would also be implemented without exiting the non-interactive mode. If the second policy is less restrictive, an explicit exit operation or an assertion may be mandated. For example, if the first policy is to remove power associated with a USB, and the second policy is to disable a port associated with the USB, then the second policy may be determined to be less restrictive and the explicit exit operation or the assertion may be mandated. For example, the method may query the policy for an explicit exit operation. In another example, the method may request confirmation from the administrator prior to implementing the second policy.

The method proceeds to decision block 320 where the method determines whether the assertion detected or received is an assertion to enter the non-interactive mode. If the assertion is to enter the non-interactive mode, then the "YES" branch is taken and the method proceeds to decision block 325. If the assertion is to not enter the non-interactive mode, then the "NO" branch is taken and the method loops back to block 315. At decision block 325, the method determines whether the assertion is authorized. For example, the method may require password verification. In another example, the method may validate a digital certificate associated with the assertion. In addition, the method may also validate the policy associated with the assertion. If the assertion is authorized, then the "YES" branch is taken and the method proceeds to block 335. If the assertion is not authorized, then the "NO" branch is taken and the method proceeds to block 330 where the method logs an error associated with the unauthorized assertion. The method then loops back to block 315.

At block 335, the method determines the policy associated with the assertion. The method may also determine one or more firmware or devices associated with the policy. The method may implement the policy by modifying the current configuration settings of a firmware or device. In one embodiment, the information may be used to update the firmware associated with the device. In another embodiment, the method may modify the configuration settings of the device to limit interaction to the device. The configuration settings may be associated with one or more features of the device based on the policy. As such, the modification may include modifying an attribute associated with a feature of the device. For example, if the current configuration setting of the device allows I/O data, the method may modify the current configuration setting to disallow or restrict I/O traffic through the device. In another embodiment, the method may restrict the power transition states of the device and/or system interactions with the device. For example, the method may not allow the device to be powered on or shutdown a powered-on device. The method may also restrict a class of peripherals to be connected to a port or disable the port for a particular time period. In yet another example, the method may disable an image device, such as a webcam, and an audio input device, such as a microphone, to prevent the devices from being hijacked by an unauthorized user to obtain confidential, classified, restricted, or other information.

The method proceeds to block 340 where the current configuration state, that is with the modified configuration settings, is saved in a non-volatile storage. The non-volatile storage may be an NV-RAM associated with the embedded controller. The non-volatile storage may be shared by the embedded controller with a chipset or processor of the information handling system. The modified configuration settings may be saved in a variable or an attribute associated with the embedded controller. In another embodiment, the modified configuration settings may be saved in ACPI system description tables. At this point, the information handling system may be in a non-interactive mode and the method may loop back to block 315.

The method may also proceed to block 360 where the method monitors for an assertion to exit the non-interactive mode. Similar to block 315, the assertion may be user-initiated as shown in block 345, timer-based initiated as shown in block 350, or initiated by an operating system instruction as shown in block 355. The method then proceeds to decision block 365 where the method determines whether an assertion to exit the non-interactive mode is received or detected. If the assertion is an assertion to exit the non-interactive mode, then the "YES" branch is taken and the method proceeds to block 370 otherwise the "NO" branch is taken and the method loops back to block 360.

At block 370, the method may configure the information handling system to enter an interactive mode. The method may also reverse the changes to the configuration settings made in block 335. In other words, the method may also restore the configuration settings to previous settings prior to the changes made in block 335.

Although FIG. 3 show example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 315 and block 360 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a non-transitory computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    if a first assertion for an information handling system to enter a non-interactive mode is detected, then enabling the information handling system to enter the non-interactive mode, by a service processor, including configuring the information handling system to limit user interaction to a first input/output component of the information handling system based on a first policy associated with the first assertion, wherein the first policy includes modifying a first configuration setting associated with a first feature of the first input/output component, and wherein the configuring the information handling system to limit user interaction to the first input/output component includes restricting input/output traffic to the first input/output component by filtering input/output activities to the information handling system:
    if a second assertion is detected subsequent to the first assertion, then comparing a second policy with the first policy to determine whether the second policy is more restrictive than the first policy, wherein the second policy is associated with the second assertion; and
    saving, by the service processor, the modified first configuration setting associated with the first input/output component in response to determining that the first policy is more restrictive.

2. The method of claim 1, wherein the first assertion is initiated by a user.

3. The method of claim 1, wherein the first assertion is initiated by a timer or by an operating system instruction.

4. The method of claim 1, further comprising if the second policy is more restrictive than the first policy, then modifying a second configuration setting associated with a second feature of a second input/output component of the information handling system.

5. The method of claim 1, further comprising if the second policy is less restrictive than the first policy, then requiring an exit operation.

6. The method of claim 1, further comprising subsequent to the information handling system entering the non-interactive mode, monitoring the information handling system to detect a third assertion to exit the non-interactive mode.

7. The method of claim 1, further comprising subsequent to a reboot of the information handling system, configuring the first input/output component based on the saved first configuration setting.

8. The method of claim 1, wherein the modifying the first configuration setting includes restricting power transition states of the first input/output component of the information handling system.

9. The method of claim 1, wherein the modifying the first configuration setting includes removing power to the first input/output component.

10. The method of claim 1, wherein the modifying the first configuration setting includes restricting a class of peripherals from connecting to a universal serial bus port.

11. An information handling system, comprising:
a policy store configured to store a plurality of policies, wherein one of the policies is associated with a feature of a device of the information handling system; and
a service processor configured to:
if a first assertion for the information handling system to enter a non-interactive mode is detected, wherein the first assertion is associated with the one policy, then modify a configuration setting associated with the feature of the device that includes restricting power transition states of the device, wherein the device may not be allowed to be powered on or shut down;
if a second assertion is detected subsequent to the first assertion, then comparing another policy with the one policy to determine whether the other policy is more restrictive than the one policy, wherein the other policy is associated with the second assertion; and
save the modified configuration setting associated with the device in response to determining that the one policy is more restrictive.

12. The information handling system of claim 11, wherein the service processor is further configured to monitor the information handling system to detect the second assertion to exit the non-interactive mode subsequent to the information handling system entering the non-interactive mode.

13. The information handling system of claim 12, wherein the service processor is further configured to reverse the modified configuration setting associated with the device subsequent to the detection of the second assertion.

14. The information handling system of claim 11, wherein the service processor is further configured to determine whether the first assertion is authorized.

15. The information handling system of claim 11, wherein the service processor is further configured to apply the saved configuration setting on reboot of the information handling system.

16. A non-transitory computer-readable medium including instructions that when executed cause an information handling system to perform operations comprising:
if an assertion for the information handling system to enter a non-interactive mode is detected, then configuring the information handling system to limit user interaction to a component of the information handling system based on a policy associated with the assertion, wherein the configuring includes modifying a configuration setting associated with the component and filtering input/output activities to the information handling system:
if another assertion is detected subsequent to the assertion, then comparing another policy with the policy to determine whether the other policy is more restrictive than the policy, wherein the other policy is associated with the other assertion; and
saving the modified configuration setting associated with the component in response to determining that the policy is more restrictive.

17. The non-transitory computer-readable medium of claim 16, wherein the modifying the configuration setting includes disabling a port associated with the component for a particular period.

18. The non-transitory computer-readable medium of claim 16, wherein the configuration setting is associated with a feature of the component.

19. The non-transitory computer-readable medium of claim 16, wherein the modifying the configuration setting includes changing a power transition state of the component.

* * * * *